United States Patent
Liu

(10) Patent No.: US 10,302,514 B2
(45) Date of Patent: May 28, 2019

(54) PRESSURE SENSOR HAVING A MULTIPLE WHEATSTONE BRIDGE CONFIGURATION OF SENSE ELEMENTS

(71) Applicant: NXP USA, INC., Austin, TX (US)

(72) Inventor: Lianjun Liu, Chandler, AZ (US)

(73) Assignee: NXP USA, Inc., Austin, TX (US)

( * ) Notice: Subject to any disclaimer, the term of this patent is extended or adjusted under 35 U.S.C. 154(b) by 306 days.

(21) Appl. No.: 15/382,692

(22) Filed: Dec. 18, 2016

(65) Prior Publication Data

US 2018/0172533 A1    Jun. 21, 2018

(51) Int. Cl.
  *G01L 9/00*   (2006.01)
  *G01L 9/06*   (2006.01)
  *G01L 9/04*   (2006.01)

(52) U.S. Cl.
  CPC .......... *G01L 9/0052* (2013.01); *G01L 9/0044* (2013.01); *G01L 9/0055* (2013.01); *G01L 9/04* (2013.01); *G01L 9/065* (2013.01)

(58) Field of Classification Search
  CPC ... G01L 19/147; G01L 9/0042; G01L 9/0072; G01L 13/025; G01L 19/04; G01L 9/0054; G01L 9/0075; G01L 19/0038; G01L 19/0084; G01L 19/14; G01L 19/0069; G01L 19/0618; G01L 19/0645;
  (Continued)

(56) References Cited

U.S. PATENT DOCUMENTS 6,006,607 A * 12/1999 Bryzek ................ G01L 9/0054
                                                        338/42

7,856,885 B1 * 12/2010 Bhansali .............. G01D 11/245
                                                        73/715
(Continued)

FOREIGN PATENT DOCUMENTS

| DE | 10211002884 A1 | 12/2015 |
|----|---------------|---------|
| EP | 2963404 A1    | 1/2016  |
| JP | H-10-213503   | 8/1998  |

OTHER PUBLICATIONS

Rajavelu, Muthapillai et al; "Enhanced sensitivity with extended linearity in MEMS piezoresistive pressure sensor"; Micro and Nano Letters, vol. 8, Iss. 10; pp. 753-756 (2013).

(Continued)

*Primary Examiner* — Andre J Allen
(74) *Attorney, Agent, or Firm* — Charlene R. Jacobsen

(57) ABSTRACT

A pressure sensor includes a diaphragm suspended across a cavity in a substrate. A first group of piezoresistors is provided in the diaphragm proximate a first outer edge of the diaphragm, the piezoresistors of the first group being coupled to one another to form a first Wheatstone bridge. A second group of piezoresistors is provided in the diaphragm proximate a second outer edge of the diaphragm, the piezoresistors of the second group being coupled to one another to form a second Wheatstone bridge. The first and second Wheatstone bridges exhibit mirror symmetry relative to one another. Output signals from each of the first and second Wheatstone bridges are processed at respective first and second differential amplifiers. The output signals from each of the first and second differential amplifiers are processed at a third differential amplifier to produce a pressure output signal with enhanced sensitivity and reduced impact from process variation.

19 Claims, 3 Drawing Sheets

(58) Field of Classification Search
CPC . G01L 9/0055; G01L 9/0073; G01L 19/0092; G01L 19/143; G01L 9/0051; G01L 9/0052; G01L 11/025; G01L 19/0007; G01L 19/0046; G01L 19/06; G01L 19/0627; G01L 19/0681; G01L 9/00; G01L 9/0041; G01L 9/0044; G01L 11/04; G01L 19/0023; G01L 19/0672; G01L 19/069; G01L 19/142; G01L 19/16; G01L 27/002; G01L 7/00; G01L 7/163; G01L 7/166; G01L 9/0047; G01L 11/02; G01L 13/00; G01L 15/00; G01L 19/0609; G01L 19/083; G01L 19/10; G01L 19/148; G01L 7/08; G01L 9/0045; G01L 9/0048; G01L 9/006; G01L 9/007; G01L 9/0076; G01L 9/045; G01L 9/06; G01L 9/065; G01L 9/12; G01L 9/125; G01L 11/00; G01L 17/00; G01L 19/00; G01L 19/0015; G01L 19/003; G01L 19/0076; G01L 19/02; G01L 19/08; G01L 19/141; G01L 19/145; G01L 19/146; G01L 1/142; G01L 1/2262; G01L 1/246; G01L 21/12; G01L 23/16; G01L 27/005; G01L 27/007; G01L 7/04; G01L 7/063; G01L 7/082; G01L 7/084; G01L 7/086; G01L 7/16; G01L 9/0002; G01L 9/0007; G01L 9/0016; G01L 9/0019; G01L 9/0022; G01L 9/0027; G01L 9/0033; G01L 9/0039; G01L 9/005; G01L 9/0058; G01L 9/0077; G01L 9/0079; G01L 9/008; G01L 9/0092; G01L 9/0095; G01L 9/025; G01L 9/04; G01L 9/08; G01L 9/085; G01L 9/105; G01L 9/14; G01L 9/16

See application file for complete search history.

(56) References Cited

U.S. PATENT DOCUMENTS

| | | | |
|---|---|---|---|
| 8,171,800 | B1 | 5/2012 | Chiou |
| 9,073,746 | B2 * | 7/2015 | Liu ..................... B81C 1/00158 |
| 2007/0152679 | A1 * | 7/2007 | Kurtz .................... G01L 9/0052 324/610 |
| 2015/0008544 | A1 * | 1/2015 | Yazawa ................ G01L 9/0054 257/417 |
| 2015/0114129 | A1 * | 4/2015 | Chen ..................... G01L 9/0052 73/721 |
| 2015/0187961 | A1 | 7/2015 | Kim et al. |
| 2015/0268114 | A1 * | 9/2015 | Takeuchi .............. G01L 9/0054 73/384 |
| 2017/0205299 | A1 * | 7/2017 | Zhang ................... G01L 9/0055 |
| 2018/0093881 | A1 * | 4/2018 | Chiou .................. B81B 3/0059 |
| 2018/0292280 | A1 * | 10/2018 | Holm ........................ G01L 9/06 |

OTHER PUBLICATIONS

U.S. Appl. No. 15/480,508, filed Apr. 6, 2017, not yet published, 27 pages.
U.S. Appl. No. 15/424,994, filed Feb. 6, 2017, not yet published, 38 pages.

* cited by examiner

PRESSURE SENSOR HAVING A MULTIPLE WHEATSTONE BRIDGE CONFIGURATION OF SENSE ELEMENTS

TECHNICAL FIELD OF THE INVENTION

The present invention relates generally to microelectromechanical systems (MEMS) pressure sensors. More specifically, the present invention relates to a MEMS pressure sensor having a multiple Wheatstone bridge configuration of sense elements for enhanced sensitivity and improved robustness to process variations.

BACKGROUND OF THE INVENTION

Conventional piezoresistive pressure sensors are formed by a Wheatstone bridge that includes four piezoresistors. These four piezoresistors are placed near the edge of a deformable membrane, i.e., a diaphragm, where the stress change is high under external pressure. Of the four piezoresistors, two may be symmetrically positioned parallel to the adjacent diaphragm edge, and the other two may be symmetrically positioned normal, i.e., perpendicular, to the adjacent diaphragm edge. Under external pressure, the piezoresistors in parallel to the adjacent diaphragm edge are subjected to opposite stresses relative to the two piezoresistors that are normal to the adjacent diaphragm edge. This results in increased resistance for the piezoresistors that are normal and decreased resistance for the piezoresistors that are parallel. Accordingly, the output voltage of the Wheatstone bridge changes with external applied pressure.

In general, there are two types of pressure sensor designs based on Wheatstone bridges. One type of design places all four piezoresistors of the Wheatstone bridge proximate one edge of the diaphragm. The other type of design places one piezoresistor of the Wheatstone bridge on each of the four edges of the diaphragm. In either configuration, an electronic circuit detects the resistance changes of the piezoresistive bridge and outputs an electrical signal representative of the external applied pressure.

Increasing the pressure sensitivity of a pressure sensor may provide improved resolution and therefore yield improved device performance. Device sensitivity may be increased by increasing the size of a diaphragm. That is, a bigger diaphragm can provide higher deflection under a given applied external pressure and generate more change in stress at the piezoresistor locations. More change in stress at the piezoresistor locations produces a larger electrical output, therefore increased sensitivity. However, a larger diaphragm has the disadvantages of more fragile die/wafer, larger die size/higher cost, and degraded linearity performances.

Further, prior art piezoresistive pressure sensors can be very sensitive to process variations, especially the alignment of piezoresistor locations to the pressure cavity. That is, during fabrication, there can be a misalignment between the backside cavity of a pressure sensor and the piezoresistors formed in the diaphragm suspended across the cavity. Since the piezoresistors are placed symmetrically along the edge of the diaphragm, any cavity misalignment may translate to an asymmetry of the piezoresistors which can result in an output offset of the Wheatstone bridge.

BRIEF DESCRIPTION OF THE DRAWINGS

The accompanying figures in which like reference numerals refer to identical or functionally similar elements throughout the separate views, the figures are not necessarily drawn to scale, and which together with the detailed description below are incorporated in and form part of the specification, serve to further illustrate various embodiments and to explain various principles and advantages all in accordance with the present invention.

DETAILED DESCRIPTION

In overview, the present disclosure concerns a pressure sensor with enhanced sensitivity and improved robustness to process variations. More particularly, the pressure sensor includes a multiple Wheatstone bridge configuration of piezoresistors that enable enhanced sensitivity and yield improvements in robustness to process variations. A pressure sensor design with reduced adverse impact from process variation can improve device performance and reproducibility. Further, the pressure sensor design may enable the reduction of test insertions, and, therefore test time, over a variety of temperatures and pressures. As such, various inventive concepts and principles embodied in the pressure sensor may improve product quality while enabling cost savings.

The instant disclosure is provided to further explain in an enabling fashion the best modes, at the time of the application, of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It should be understood that the use of relational terms, if any, such as first and second, top and bottom, and the like are used solely to distinguish one from another entity or action without necessarily requiring or implying any actual such relationship or order between such entities or actions.

Figure 1:
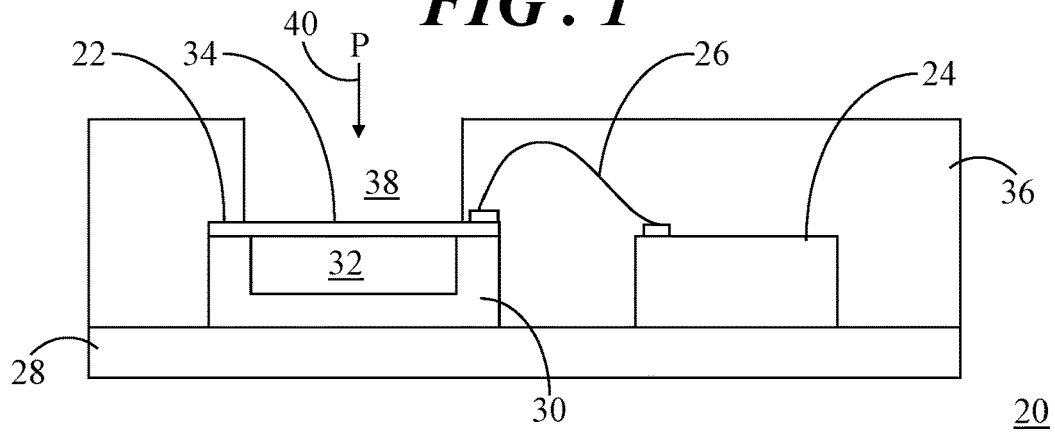
FIG. 1 shows a side view of a pressure sensor in a simplified form.

Referring to FIG. 1, FIG. 1 shows a side view of a pressure sensor 20 in a simplified form. In general, pressure sensor 20 includes a pressure sensing element 22 and an application specific integrated circuit (ASIC) 24 electrically connected to pressure sensing element 22 via a plurality of bond wires 26 (one visible). Pressure sensing element 22 and ASIC 24 may, in some configurations, be coupled to a common base 28. Pressure sensing element 22 generally includes a substrate 30 having a cavity 32.

A deformable membrane, referred to herein as a diaphragm 34, is suspended across cavity 32. In some embodiments, pressure sensing element 22 and ASIC 24 may be encapsulated in a molding compound 36. A port 38 may thus extend through molding compound 36 so as to expose diaphragm 34 to an external applied pressure, P, 40. Under external applied pressure 40, diaphragm 34 deforms. ASIC 24 detects the resistance changes of piezoresistors (discussed below) provided in diaphragm 34 and outputs an electrical signal representative of external applied pressure 40.

Figure 2:
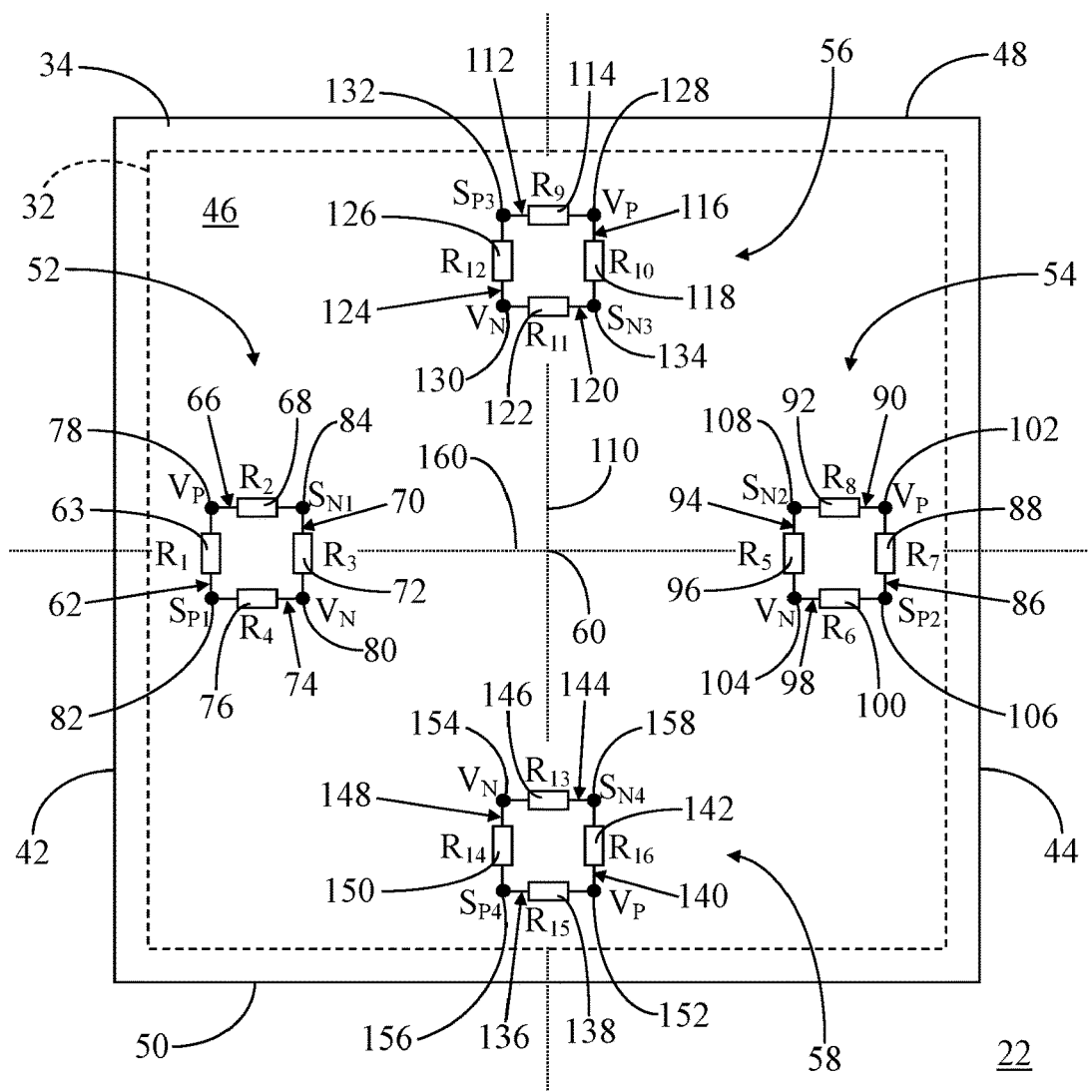
FIG. 2 shows a top view of a pressure sensing element of the pressure sensor of FIG. 1 in accordance with an embodiment.

FIG. 2 shows a top view of pressure sensing element 22 of pressure sensor 20 (FIG. 1) in accordance with an embodiment. In particular, diaphragm 34 is shown with a plurality of sense elements, e.g., piezoresistors, provided therein. Diaphragm 34 has a first outer edge 42 and a second outer edge 44 disposed on opposing sides of a surface 46 of diaphragm 34. Diaphragm 34 further has a third outer edge 48 and a fourth outer edge 50 disposed on opposing sides of surface 46 of diaphragm 34 and interposed between first and second outer edges 42, 44. Thus, surface 46 is circumscribed by first, second, third, and fourth outer edges 42, 44, 48, 50. A dashed line box represents the outer perimeter of cavity 32 underlying diaphragm 34.

In an embodiment, pressure sensing element 22 includes multiple Wheatstone bridges circuits, each of which includes four piezoresistors that are placed together near one outer edge of diaphragm 34. In this example, a first group of piezoresistors is provided in diaphragm 34 proximate first outer edge 42 of diaphragm 34. The piezoresistors of the first group are coupled to one another to form a first Wheatstone bridge 52. A second group of piezoresistors is provided in diaphragm 34 proximate second outer edge 44 of diaphragm 34. The piezoresistors of the second group are coupled to one another to form a second Wheatstone bridge 54. Similarly, a third group of piezoresistors is provided in diaphragm 34 proximate third outer edge 48 of diaphragm 34. The piezoresistors of the third group are coupled to one another to form a third Wheatstone bridge 56. A fourth group of piezoresistors is provided in diaphragm 34 proximate fourth outer edge 50 of diaphragm 34. The piezoresistors of the fourth group are coupled to one another to form a fourth Wheatstone bridge 58.

Each of first, second, third, and fourth Wheatstone bridges 52, 54, 56, 58 is approximately equidistant from its respective, first, second, third, and fourth outer edges 42, 44, 48, 50. In an ideal configuration, diaphragm 34 would be centered over cavity 32 (as shown in FIG. 2) so that each of first, second, third, and fourth Wheatstone bridges 52, 54, 56, 58 is subject to the same stress level on surface 46 of diaphragm as a function of the distance from a center 60 of cavity 32 in response to external applied pressure 40 (FIG. 1). However, process variation can result can result in misalignment of diaphragm 34 to cavity 32, and therefore misalignment of Wheatstone bridges 52, 54, 56, 58 to center 60 of cavity 32. Nevertheless, the configuration of piezoresistors in Wheatstone bridges 52, 54, 56, 68 largely cancels any output offset in the event of a misalignment of diaphragm 34 to cavity 32, as will be discussed in greater detail below.

With particular reference to the structure and arrangement of the Wheatstone bridges, first Wheatstone bridge 52 includes a first leg 62 having a first piezoresistor 64, labeled $R_1$, a second leg 66 having a second piezoresistor 68, labeled $R_2$, a third leg 70 having a third piezoresistor 72, labeled $R_3$, and a fourth leg 74 having a fourth piezoresistor 76, labeled $R_4$. First and fourth piezoresistors 64, 76 are coupled in series to form a first half of first Wheatstone bridge 52. Second and third piezoresistors 68, 72 are coupled in series to form a second half of first Wheatstone bridge 52. The first half of first Wheatstone bridge 52 is coupled in parallel with the second half of first Wheatstone bridge 52 such that a first node between first and second piezoresistors 64, 68 forms a first input terminal 78, labeled $V_P$, and a second node between third and fourth piezoresistors 72, 76 forms a second input terminal 80, labeled $V_N$. In accordance with the Wheatstone bridge configuration, a third node between first and fourth piezoresistors 64, 76 forms a first positive output terminal 82, labeled $S_{P1}$, and a fourth node between second and third piezoresistors 68, 72 forms a first negative output terminal 84, labeled $S_{N1}$. It can be readily observed that first and third legs 62, 70 are oriented substantially parallel to first outer edge 42 of diaphragm 34. Additionally, second and fourth legs 66, 74 are oriented substantially normal, i.e., perpendicular, to first outer edge 42 of diaphragm 34.

Now with reference to second Wheatstone bridge 54, second Wheatstone bridge 54 includes a first leg 86 having a first piezoresistor 88, labeled $R_7$, a second leg 90 having a second piezoresistor 92, labeled $R_8$, a third leg 94 having a third piezoresistor 96, labeled $R_5$, and a fourth leg 98 having a fourth piezoresistor 100, labeled $R_6$. First and fourth piezoresistors 88, 100 are coupled in series to form a first half of second Wheatstone bridge 54. Second and third piezoresistors 92, 96 are coupled in series to form a second half of second Wheatstone bridge 54. The first half of second Wheatstone bridge 54 is coupled in parallel with the second half of second Wheatstone bridge 54 such that a first node between first and second piezoresistors 88, 92 forms a first input terminal 102, labeled $V_P$, and a second node between third and fourth piezoresistors 96, 100 forms a second input terminal 104, labeled $V_N$. In accordance with the Wheatstone bridge configuration, a third node between first and fourth piezoresistors 88, 100 forms a second positive output terminal 106, labeled $S_{P2}$, and a fourth node between second and third piezoresistors 92, 96 forms a second negative output terminal 108, labeled $S_{N2}$. Again, it can be readily observed that first and third legs 86, 94 are oriented substantially parallel to second outer edge 44 of diaphragm 34. Additionally, second and fourth legs 90, 98 are oriented substantially normal, i.e., perpendicular, to second outer edge 44 of diaphragm 34.

Of particular interest herein, first Wheatstone bridge 52 and second Wheatstone bridge 54 exhibit mirror symmetry relative to one another along a first line, or axis, of symmetry 110 that is parallel to surface 46 of diaphragm 34. Mirror symmetry, also referred to as reflection symmetry, is symmetry with respect to reflection. By way of explanation, if diaphragm 34 was folded in half at line of symmetry 110, the two halves of diaphragm 34 would be identical, i.e., the two halves are each other's mirror images. As such, any feature of first Wheatstone bridge 52 is the same distance away from first line of symmetry 110 as the same feature of second Wheatstone bridge 54. Accordingly, first, second, third, and fourth legs 86, 90, 94, 98 of second Wheatstone bridge 54 are disposed the same distance away from first line of symmetry 110, and are in the same relative positions, as first, second, third, and fourth legs 62, 66, 70, 74 of first Wheatstone bridge 52. Likewise, first and second input terminals 102, 104, second positive output terminal 106, and second negative output terminal 108 are disposed the same distance away from first line of symmetry 110, and are in the same relative positions, as first and second input terminals 78, 80, first positive output terminal 82, and first negative output terminal 84.

Referring now to third Wheatstone bridge 56, third Wheatstone bridge 56 includes a first leg 112 having a first piezoresistor 114, labeled $R_9$, a second leg 116 having a second piezoresistor 118, labeled $R_{10}$, a third leg 120 having a third piezoresistor 122, labeled $R_{11}$, and a fourth leg 124 having a fourth piezoresistor 126, labeled $R_{12}$. First and fourth piezoresistors 114, 126 are coupled in series to form a first half of third Wheatstone bridge 56. Second and third piezoresistors 118, 122 are coupled in series to form a second half of third Wheatstone bridge 56. The first half of third Wheatstone bridge 56 is coupled in parallel with the second half of third Wheatstone bridge 56 such that a first node between first and second piezoresistors 114, 118 forms a first input terminal 128, labeled $V_P$, and a second node between third and fourth piezoresistors 122, 126 forms a second input terminal 130, labeled $V_N$. In accordance with the Wheatstone bridge configuration, a third node between first and fourth piezoresistors 114, 126 forms a third positive output terminal 132, labeled $S_{P3}$, and a fourth node between second and third piezoresistors 118, 122 forms a third negative output terminal 134, labeled $S_{N3}$. It can be readily observed that first and third legs 112, 120 are oriented substantially parallel to third outer edge 48 (and hence perpendicular to first and second outer edges 42, 44) of diaphragm 34. Additionally, second and fourth legs 116, 124 are oriented substantially normal, i.e., perpendicular, to third outer edge 48 (and hence parallel to first and second outer edges 42, 44) of diaphragm 34.

Fourth Wheatstone bridge 58 includes a first leg 136 having a first piezoresistor 138, labeled $R_{15}$, a second leg 140 having a second piezoresistor 142, labeled $R_{16}$, a third leg 144 having a third piezoresistor 146, labeled $R_{13}$, and a fourth leg 148 having a fourth piezoresistor 150, labeled $R_{14}$. First and fourth piezoresistors 138, 150 are coupled in series to form a first half of fourth Wheatstone bridge 58. Second and third piezoresistors 142, 146 are coupled in series to form a second half of fourth Wheatstone bridge 58. The first half of fourth Wheatstone bridge 58 is coupled in parallel with the second half of fourth Wheatstone bridge 58 such that a first node between first and second piezoresistors 138, 142 forms a first input terminal 152, labeled $V_P$, and a second node between third and fourth piezoresistors 146, 150 forms a second input terminal 154, labeled $V_N$. In accordance with the Wheatstone bridge configuration, a fourth node between first and fourth piezoresistors 138, 150 forms a fourth positive output terminal 156, labeled $S_{P4}$, and a fourth node between second and third piezoresistors 142, 146 forms a fourth negative output terminal 158, labeled $S_{N4}$. Again, it can be readily observed that first and third legs 136, 144 are oriented substantially parallel to fourth outer edge 50 (and hence perpendicular to first and second outer edges 42, 44) of diaphragm 34. Additionally, second and fourth legs 140, 148 are oriented substantially normal, i.e., perpendicular, to fourth outer edge 50 (and hence parallel to first and second outer edges 42, 44) of diaphragm 34.

Third Wheatstone bridge 56 and fourth Wheatstone bridge 58 exhibit mirror symmetry relative to one another along a second line, or axis, of symmetry 160. Like first line of symmetry 110, second line of symmetry is parallel to surface 46 of substrate 34. However, second line of symmetry 160 is orthogonal to first line of symmetry 110. Accordingly, first, second, third, and fourth legs 136, 140, 144, 148 of fourth Wheatstone bridge 58 are disposed the same distance away from second line of symmetry 160, and are in the same relative positions, as first, second, third, and fourth legs 112, 116, 120, 124 of third Wheatstone bridge 56. Likewise, first and second input terminals 152, 154, fourth positive output terminal 156, and fourth negative output terminal 158 of fourth Wheatstone bridge 58 are disposed the same distance away from second line of symmetry 160, and are in the same relative positions, as first and second input terminals 128, 130, third positive output terminal 132, and third negative output terminal 134 of third Wheatstone bridge 56.

Figure 3:
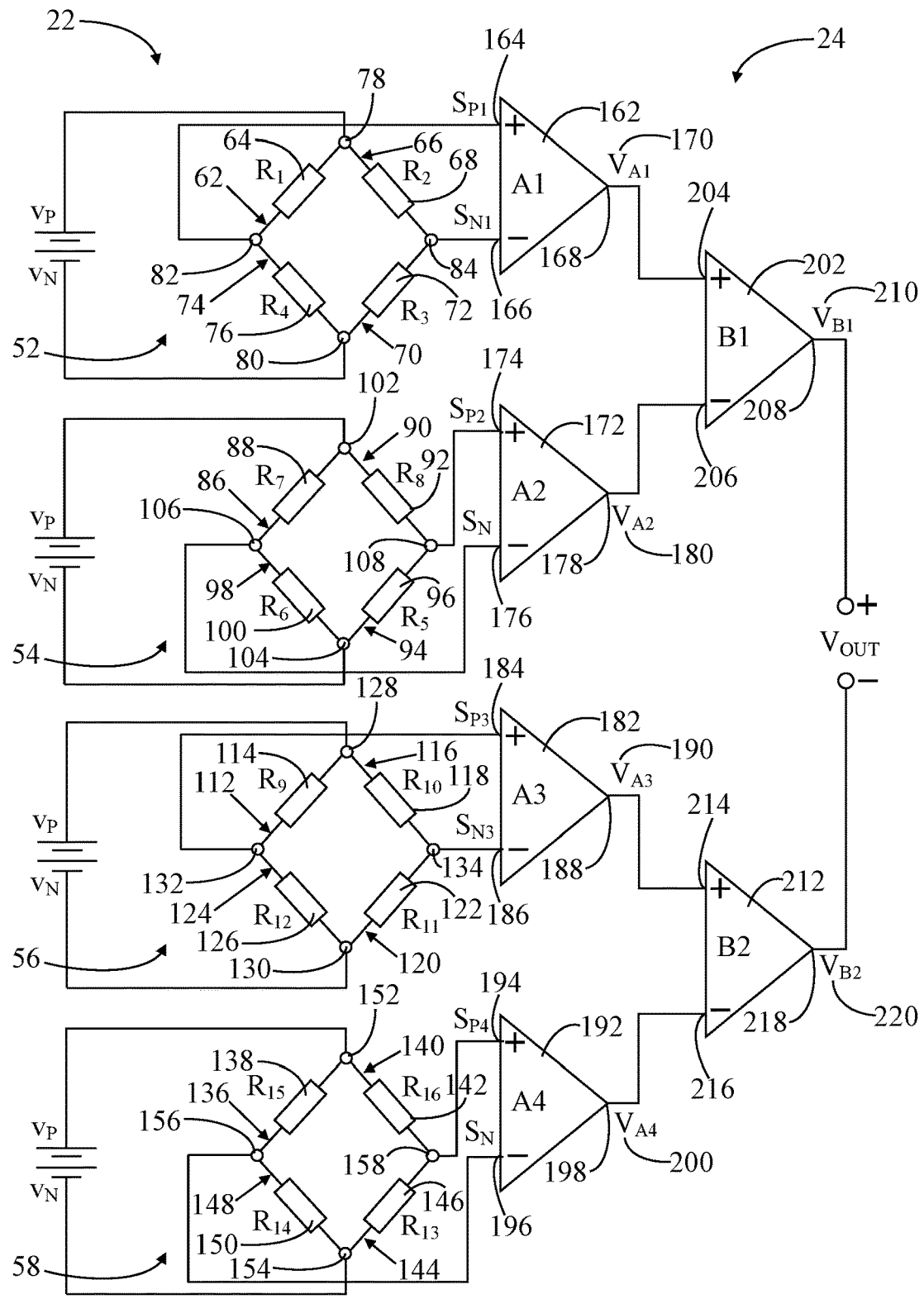
FIG. 3 shows a circuit diagram of the pressure sensor of FIG. 1.

Now referring to FIG. 3 concurrently with FIG. 2, FIG. 3 shows a circuit diagram of pressure sensor 20 (FIG. 1) having the multiple Wheatstone bridge configuration shown in FIG. 2. In particular, FIG. 3 shows first, second, third, and fourth Wheatstone bridges 52, 54, 56, 58 of pressure sensing element 22 and their interconnection with multiple differential amplifiers of ASIC 24.

When a voltage is input to first input terminals 78, 80 ($V_P$, $V_N$) of first Wheatstone bridge 52, the output voltage at first output terminals 82, 84 ($S_{P1}$, $S_{N1}$) changes in response to changes in the values of first, second, third, and fourth piezoresistors 64, 68, 72, 76 ($R_1$, $R_2$, $R_3$, $R_4$). Similarly, when voltage is input to first input terminals 102, 104 ($V_P$, $V_N$) of second Wheatstone bridge 54, the output voltage at second output terminals 106, 108 ($S_{P2}$, $S_{N2}$) changes in response to changes in the values of first, second, third, and fourth piezoresistors 88, 92, 96, 100 ($R_7$, $R_8$, $R_5$, $R_6$). When voltage is input to first input terminals 128, 130 ($V_P$, $V_N$) of third Wheatstone bridge 56, the output voltage at third output terminals 132, 134 ($S_{P3}$, $S_{N3}$) changes in response to changes in the values of first, second, third, and fourth piezoresistors 114, 118, 122, 126 ($R_9$, $R_{10}$, $R_{11}$, $R_{12}$). When voltage is input to first input terminals 152, 154 ($V_P$, $V_N$) of fourth Wheatstone bridge 58, the output voltage at fourth output terminals 156, 158 ($S_{P4}$, $S_{N4}$) changes in response to changes in the values of first, second, third, and fourth piezoresistors 138, 142, 146, 150 ($R_{15}$, $R_{16}$, $R_{13}$, $R_{14}$). Since piezoresistors 64, 68, 72, 76, 88, 92, 96, 100, 114, 118, 122, 126, 138, 142, 146, 150 are formed in diaphragm 34 of pressure sensing element 22, the nominal resistance of each of the piezoresistors will change when diaphragm 34 deflects in response to external pressure 40 (FIG. 1).

In an embodiment, ASIC 24 includes a first differential amplifier 162, labeled A1, having a first positive terminal 164, a first negative terminal 166, and a first output terminal 168. First positive terminal 164 is coupled to first positive output terminal 82 of first Wheatstone bridge 52 and first negative terminal 166 is coupled to first negative output terminal 84 of first Wheatstone bridge 52. First differential amplifier 162 amplifies the difference between the two input voltages at first positive and negative terminals 164, 166 and suppresses any voltage common to first positive and negative terminals 164, 166. Thus, a first signal, referred to herein as a first voltage 170, $V_{A1}$, is output from first output terminal 168 of first differential amplifier 162 and is proportional to the difference between the two voltages as $V_{A1}=A(S_{P1}-S_{N1})$, where "A" represents the gain of first differential amplifier 162.

ASIC 24 includes a second differential amplifier 172, labeled A2, having a second positive terminal 174, a second negative terminal 176, and a second output terminal 178. Second positive terminal 174 is coupled to second negative output terminal 108 of second Wheatstone bridge 54 and second negative terminal 176 is coupled to second positive output terminal 106 of second Wheatstone bridge 54. Second differential amplifier 172 amplifies the difference between the two input voltages at second positive and negative terminals 174, 176 and suppresses any voltage common to second positive and negative terminals 174, 176. Thus, a second signal, referred to herein as a second voltage 180, $V_{A2}$, is output from second output terminal 178 and is proportional to the difference between the two voltages as $V_{A2}=A(S_{P2}-S_{N2})$, where "A" represents the gain of second differential amplifier 172.

ASIC 24 includes a third differential amplifier 182, labeled A3, having a third positive terminal 184, a third negative terminal 186, and a third output terminal 188. Third positive terminal 184 is coupled to third positive output terminal 132 of third Wheatstone bridge 56 and third negative terminal 186 is coupled to third negative output terminal 134 of third Wheatstone bridge 56. Third differential amplifier 182 amplifies the difference between the two input voltages at third positive and negative terminals 184, 186 and suppresses any voltage common to third positive and negative terminals 184, 186. Thus, a third signal, referred to herein as a third voltage 190, $V_{A3}$, is output from third output terminal 188 and is proportional to the difference between the two voltages as $V_{A3}=A(S_{P3}-S_{N3})$, where "A" represents the gain of third differential amplifier 182.

ASIC 24 includes a fourth differential amplifier 192, labeled A4, having a fourth positive terminal 194, a fourth negative terminal 196, and a fourth output terminal 198. Fourth positive terminal 194 is coupled to fourth negative output terminal 158 of fourth Wheatstone bridge 58 and fourth negative terminal 196 is coupled to fourth positive output terminal 156 of fourth Wheatstone bridge 58. Fourth differential amplifier 192 amplifies the difference between the two input voltages at fourth positive and negative terminals 194, 196 and suppresses any voltage common to fourth positive and negative terminals 194, 196. Thus, a fourth signal, referred to herein as a fourth voltage 200, $V_{A4}$, is output from fourth output terminal 198 and is proportional to the difference between the two voltages as $V_{A4}=A(S_{P4}-S_{N4})$, where "A" represents the gain of fourth differential amplifier 192.

ASIC 24 further includes a fifth differential amplifier 202, labeled B1, having a fifth positive terminal 204, a fifth negative terminal 206, and a fifth output terminal 208. Fifth positive terminal 204 is coupled to first output terminal 168 of first differential amplifier 162 and fifth negative terminal 206 is coupled to second output terminal 178 of second differential amplifier 172. Fifth differential amplifier 202 amplifies the difference between the two input voltages at fifth positive and negative terminals 204, 206 and suppresses any voltage common to fifth positive and negative terminals 204, 206. Thus, a fifth signal, referred to herein as a fifth voltage 210, $V_{B1}$, is output from fifth output terminal 208 and is proportional to an amplified difference between the two voltages as $V_{B1}=A(V_{A1}-V_{A2})$, where "A" represents the gain of fifth differential amplifier 202.

ASIC 24 further includes a sixth differential amplifier 212, labeled B2, having a sixth positive terminal 214, a sixth negative terminal 216, and a sixth output terminal 218. Sixth positive terminal 214 is coupled to third output terminal 188 of third differential amplifier 182 and sixth negative terminal 216 is coupled to fourth output terminal 198 of fourth differential amplifier 192. Sixth differential amplifier 212 amplifies the difference between the two input voltages at sixth positive and negative terminals 214, 216 and suppresses any voltage common to sixth positive and negative terminals 214, 206. Thus, a sixth signal, referred to herein as a sixth voltage 220, $V_{B2}$, is output from sixth output terminal 218 and is proportional to an amplified difference between the two voltages as $V_{B2}=A(V_{A3}-V_{A4})$, where "A" represents the gain of sixth differential amplifier 212.

First and second Wheatstone bridges 52, 54 will have a similar output but with opposite polarities under the same external applied pressure 40 (FIG. 1) due to their mirror symmetry configuration. Likewise, third and fourth Wheatstone bridges 56, 58 will have a similar output but with opposite polarities under the same external applied pressure 40 due to their mirror symmetry configuration. For simplicity when the gain of each of differential amplifiers 162 172, 182, 192, 202, 212 is set to one, then in an ideal situation, $V_{A1}=-V_{A2}=V_{A3}=V_{A4}$. The output voltage, $V_{OUT}$, can be determined as follows:

$$V_{OUT}=V_{B1}-V_{B2} \quad (1)$$

$$V_{OUT}=V_{A1}-(-V_{A2})+V_{A3}-(-V_{A4}) \quad (2)$$

Accordingly, it can be readily observed that the output of pressure sensor 20 (FIG. 1) having the four Wheatstone bridge configuration may be four times greater than the single Wheatstone bridge configuration of prior art pressure sensors. Additionally, due to the mirror symmetry configuration of first and second Wheatstone bridges 52, 54 and third and fourth Wheatstone bridges 56, 58 and their locations in diaphragm 34 (FIG. 2), any output offset due to process variation may be canceled or significantly reduced. Of course, once the output voltage, $V_{OUT}$, is produced further electronic circuitry contained within ASIC 24 may suitably condition and convert the analog output voltage to a digital signal in accordance with known methodologies.

Figure 4:
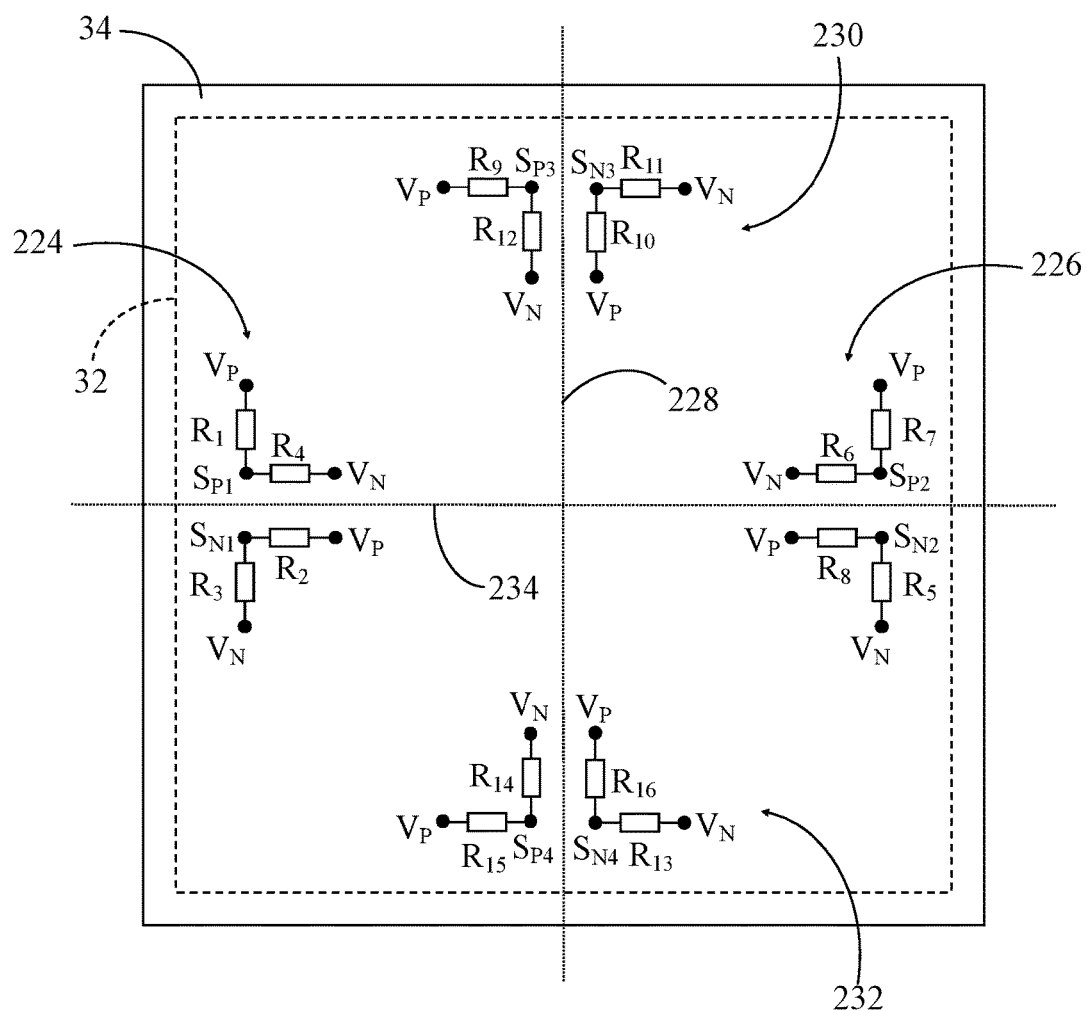
FIG. 4 shows a top view of a pressure sensing element of the pressure sensor of FIG. 1 in accordance with another embodiment.

FIG. 4 shows a top view of a pressure sensing element 222 of pressure sensor 20 (FIG. 1) in accordance with another embodiment. Pressure sensing element 222 includes all of the features of pressure sensing element 22 (FIG. 2). That is, pressure sensing element 222 includes diaphragm 34 suspended across cavity 32. Pressure sensing element 222 additionally includes a first Wheatstone bridge 224 of piezoresistive sense elements and a second Wheatstone bridge 226 of piezoresistive sense elements, in which the features of first and second Wheatstone bridges 224, 226 are arranged in mirror symmetry relative to a line of symmetry 228. Additionally, pressure sensing element 222 includes a third Wheatstone bridge 230 of piezoresistive sense elements and a fourth Wheatstone bridge 232 of piezoresistive sense elements, in which the features of third and fourth Wheatstone bridges 230, 232 are arranged in mirror symmetry relative to another line of symmetry 234.

The circuit diagram of FIG. 3 still applies to the configuration of Wheatstone bridges of pressure sensing element 222. Accordingly, the differential amplifiers described in connection with FIG. 3 could still be implemented to suitably process and combine signals to get the voltage output of the multiple Wheatstone bridge configuration of pressure sensing element 222. However, the configuration of Wheatstone bridges 224, 226, 230, 232 of pressure sensing element 222 enables the simplification of signal routing of the inputs, i.e., $V_P$ and $V_N$, and signal outputs, $S_{P1}$, $S_{N1}$, $S_{P2}$, $S_{N2}$, $S_{P3}$, $S_{N3}$, $S_{P4}$, $S_{N4}$.

Thus, embodiments disclosed herein entail a pressure sensor with enhanced sensitivity and improved robustness to process variations. An embodiment of a pressure sensor comprises a substrate having a cavity and a diaphragm suspended across the cavity, the diaphragm having first and second outer edges disposed on opposing sides of a surface of the diaphragm. A first group of sense elements is provided in the diaphragm proximate the first outer edge, the sense elements of the first group being coupled to one another to form a first Wheatstone bridge, and a second group of sense elements is provided in the diaphragm proximate the second outer edge, the sense elements of the second group being coupled to one another to form a second Wheatstone bridge.

Another embodiment of a pressure sensor comprises a substrate having a cavity and a diaphragm suspended across the cavity, the diaphragm having first and second outer edges disposed on opposing sides of a surface of the diaphragm. A first group of piezoresistors is provided in the diaphragm proximate the first outer edge, the piezoresistors of the first group being coupled to one another to form a first Wheatstone bridge, and a second group of piezoresistors is provided in the diaphragm proximate the second outer edge, the piezoresistors of the second group being coupled to one another to form a second Wheatstone bridge. The first Wheatstone bridge and the second Wheatstone bridge exhibit mirror symmetry relative to one another along a line of symmetry, and each of the first and second Wheatstone bridges is configured to produce an output signal in response to movement of the diaphragm responsive to an external pressure.

Yet another embodiment of a pressure sensor comprises a substrate having a cavity and a diaphragm suspended across the cavity, the diaphragm having first and second outer edges disposed on opposing sides of a surface of the diaphragm, and the diaphragm having third and fourth second outer edges disposed on opposing sides of the surface of the diaphragm and interposed between the first and second outer edges so that the surface of the diaphragm is circumscribed by the first, second, third, and fourth outer edges. A first group of piezoresistors is provided in the diaphragm proximate the first outer edge, the piezoresistors of the first group being coupled to one another to form a first Wheatstone bridge, and a second group of piezoresistors is provided in the diaphragm proximate the second outer edge, the piezoresistors of the second group being coupled to one another to form a second Wheatstone bridge. A third group of piezoresistors is provided in the diaphragm proximate the third outer edge, the piezoresistors of the third group being coupled to one another to form a third Wheatstone bridge, and a fourth group of piezoresistors is provided in the diaphragm proximate the fourth outer edge, the piezoresistors of the fourth group being coupled to one another to form a fourth Wheatstone bridge. Each of the first, second, third, and fourth Wheatstone bridges is configured to produce an output signal in response to movement of the diaphragm responsive to an external pressure.

Accordingly, a pressure sensor that includes a multiple Wheatstone bridge configuration of piezoresistors enables enhanced sensitivity and yield improvements in robustness to process variations. The pressure sensor design with reduced adverse impact from process variation can improve device performance and reproducibility. Further, the pressure sensor design may enable the reduction of test insertions, and, therefore test time, over a variety of temperatures and pressure. As such, various inventive concepts and principles embodied in the pressure sensor may improve product quality while enabling cost savings.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A pressure sensor comprising:
a substrate having a cavity;
a diaphragm suspended across said cavity, said diaphragm having first and second outer edges disposed on opposing sides of a surface of said diaphragm;
a first group of sense elements provided in said diaphragm proximate said first outer edge, said sense elements of said first group being coupled to one another to form a first Wheatstone bridge; and
a second group of sense elements provided in said diaphragm proximate said second outer edge, said sense elements of said second group being coupled to one another to form a second Wheatstone bridge, wherein said first Wheatstone bridge and said second Wheatstone bridge exhibit mirror symmetry relative to one another along a line of symmetry.

2. The pressure sensor of claim 1 wherein said sense elements of said first and second groups comprise piezoresistors, and each of said first and second Wheatstone bridges is configured to produce an output signal in response to movement of said diaphragm responsive to an external pressure.

3. The pressure sensor of claim 1 wherein each of said first and second Wheatstone bridge comprises:
a first sensor leg having a first one of said sense elements;
a second leg having a second one of said sense elements;
a third leg having a third one of said sense element; and
a fourth leg having a fourth one of said sense elements, said first and fourth sense elements being coupled in series to form a first half of said each of said first and second Wheatstone bridges, said second and third sense elements being coupled in series to form a second half of said each of said first and second Wheatstone bridges, said first half being coupled in parallel with said second half such that a first node between said first and second sense elements forms a first input terminal and a second node between said third and fourth sense elements forms a second input terminal, and wherein said first and third legs are parallel to said first and second outer edges, and said second and fourth legs are perpendicular to said first and second outer edges.

4. A pressure sensor comprising:
a substrate having a cavity;
a diaphragm suspended across said cavity, said diaphragm having first and second outer edges disposed on opposing sides of a surface of said diaphragm, and said diaphragm further having third and fourth edges disposed on opposing sides of said surface of said diaphragm and interposed between said first and second outer edges so that said surface of said diaphragm is circumscribed by said first, second, third, and fourth outer edges;
a first group of sense elements provided in said diaphragm proximate said first outer edge, said sense elements of said first group being coupled to one another to form a first Wheatstone bridge;
a second group of sense elements provided in said diaphragm proximate said second outer edge, said sense elements of said second group being coupled to one another to form a second Wheatstone bridge;
a third group of sense elements provided in said diaphragm proximate said third outer edge, said sense elements of said third group being coupled to one another to form a third Wheatstone bridge; and
a fourth group of sense elements provided in said diaphragm proximate said fourth outer edge, said sense elements of said fourth group being coupled to one another to form a fourth Wheatstone bridge.

5. The pressure sensor of claim 4 wherein
said first Wheatstone bridge and said second Wheatstone bridge exhibit mirror symmetry relative to one another along a first line of symmetry; and
said third Wheatstone bridge and said fourth Wheatstone bridge exhibit mirror symmetry relative to one another along a second line of symmetry, said second line of symmetry being orthogonal to said first line of symmetry.

6. The pressure sensor of claim 5 wherein said first and second lines of symmetry are parallel to said surface of said diaphragm.

7. A pressure sensor comprising:
a substrate having a cavity;
a diaphragm suspended across said cavity, said diaphragm having first and second outer edges disposed on opposing sides of a surface of said diaphragm;
a first group of sense elements provided in said diaphragm proximate said first outer edge, said sense elements of said first group being coupled to one another to form a first Wheatstone bridge; and
a second group of sense elements provided in said diaphragm proximate said second outer edge, said sense elements of said second group being coupled to one another to form a second Wheatstone bridge, wherein each of said first and second Wheatstone bridges has a positive output node and a negative output node;
a first differential amplifier having a first positive terminal, a first negative terminal, and a first output terminal, said first positive terminal being coupled to said positive output node of said first Wheatstone bridge, said first negative terminal being coupled to said negative output node of said first Wheatstone bridge, said first output terminal providing a first signal responsive to an external pressure detected by said first Wheatstone bridge; and
a second differential amplifier having a second positive terminal, a second negative terminal, and a second output terminal, said second positive terminal being coupled to said negative output node of said second Wheatstone bridge, said second negative terminal being coupled to said positive output node of said second Wheatstone bridge, and said second output terminal providing a second signal responsive to said external pressure detected by said second Wheatstone bridge.

8. The pressure sensor of claim 7 wherein said second signal is opposite in polarity from said first signal in response to said external pressure.

9. The pressure sensor of claim 7 wherein:
said diaphragm further has third and fourth second outer edges disposed on opposing sides of said surface of said diaphragm and interposed between said first and second outer edges so that said surface of said diaphragm is circumscribed by said first, second, third, and fourth outer edges; and
said pressure sensor further comprises:
a third group of sense elements provided in said diaphragm proximate said third outer edge, said sense elements of said third group being coupled to one another to form a third Wheatstone bridge;
a fourth group of sense elements provided in said diaphragm proximate said fourth outer edge, said sense elements of said fourth group being coupled to one another to form a fourth Wheatstone bridge, each of said third and fourth Wheatstone bridges having said positive output node and said negative output node;
a third differential amplifier having a third positive terminal, a third negative terminal, and a third output terminal, said third positive terminal being coupled to said positive output node of said third Wheatstone bridge, said third negative terminal being coupled to said negative output node of said third Wheatstone bridge, said third output terminal providing a third signal responsive to said external pressure detected by said third Wheatstone bridge; and
a fourth differential amplifier having a fourth positive terminal, a fourth negative terminal, and a fourth output terminal, said fourth positive terminal being coupled to said negative output node of said fourth Wheatstone bridge, said second negative terminal being coupled to said positive output node of said fourth Wheatstone bridge, and said fourth output terminal providing a fourth signal responsive to said external pressure detected by said fourth Wheatstone bridge.

10. The pressure sensor of claim 9 further comprising:
a fifth differential amplifier having a fifth positive terminal, a fifth negative terminal, and a fifth output terminal, said fifth positive terminal being coupled to said first output terminal of said first differential amplifier, said fifth negative terminal being coupled to said second output terminal of said second differential amplifier, and said fifth output terminal providing a fifth signal as an amplified difference between said first and second signals; and
a sixth differential amplifier having a sixth positive terminal, a sixth negative terminal, and a sixth output terminal, said sixth positive terminal being coupled to said third output terminal of said third differential amplifier, said sixth negative terminal being coupled to said fourth output terminal of said fourth differential amplifier, and said sixth output terminal providing a sixth signal as an amplified difference between said third and fourth signals.

11. The pressure sensor of claim 10 wherein said sixth signal is opposite in polarity from said fifth signal, and a signal output from said pressure sensor is an amplified difference between said fifth and sixth signals.

12. A pressure sensor comprising:
a substrate having a cavity;
a diaphragm suspended across said cavity, said diaphragm having first and second outer edges disposed on opposing sides of a surface of said diaphragm;
a first group of piezoresistors provided in said diaphragm proximate said first outer edge, said piezoresistors of said first group being coupled to one another to form a first Wheatstone bridge; and
a second group of piezoresistors provided in said diaphragm proximate said second outer edge, said piezoresistors of said second group being coupled to one another to form a second Wheatstone bridge, said first Wheatstone bridge and said second Wheatstone bridge exhibit mirror symmetry relative to one another along a line of symmetry, and each of said first and second Wheatstone bridges is configured to produce an output signal in response to movement of said diaphragm responsive to an external pressure.

13. The pressure sensor of claim 12 wherein each of said first and second Wheatstone bridge comprises:
a first sensor leg having a first one of said piezoresistors;
a second leg having a second one of said piezoresistors;
a third leg having a third one of said piezoresistors; and a fourth leg having a fourth one of said piezoresistors, said first and fourth piezoresistors being coupled in series to form a first half of said each of said first and second Wheatstone bridges, said second and third piezoresistors being coupled in series to form a second half of said each of said first and second Wheatstone bridges, said first half being coupled in parallel with said second half such that a first node between said first and second piezoresistors forms a first input terminal and a second node between said third and fourth piezoresistors forms a second input terminal, and wherein said first and third legs are parallel to said first and second outer edges, and said second and fourth legs are perpendicular to said first and second outer edges.

14. The pressure sensor of claim 12 wherein each of said first and second Wheatstone bridges has a positive output node and a negative output node, and said pressure sensor further comprises:
a first differential amplifier having a first positive terminal, a first negative terminal, and a first output terminal, said first positive terminal being coupled to said positive output node of said first Wheatstone bridge, said first negative terminal being coupled to said negative output node of said first Wheatstone bridge, said first output terminal providing a first signal responsive to an external pressure detected by said first Wheatstone bridge; and
a second differential amplifier having a second positive terminal, a second negative terminal, and a second output terminal, said second positive terminal being coupled to said negative output node of said second Wheatstone bridge, said second negative terminal being coupled to said positive output node of said second Wheatstone bridge, and said second output terminal providing a second signal responsive to said external pressure detected by said second Wheatstone bridge.

15. The pressure sensor of claim 14 wherein said second signal is opposite in polarity from said first signal in response to said external pressure.

16. A pressure sensor comprising:
a substrate having a cavity;
a diaphragm suspended across said cavity, said diaphragm having first and second outer edges disposed on opposing sides of a surface of said diaphragm, and said diaphragm having third and fourth second outer edges disposed on opposing sides of said surface of said diaphragm and interposed between said first and second outer edges so that said surface of said diaphragm is circumscribed by said first, second, third, and fourth outer edges;
a first group of piezoresistors provided in said diaphragm proximate said first outer edge, said piezoresistors of said first group being coupled to one another to form a first Wheatstone bridge;
a second group of piezoresistors provided in said diaphragm proximate said second outer edge, said piezoresistors of said second group being coupled to one another to form a second Wheatstone bridge;
a third group of piezoresistors provided in said diaphragm proximate said third outer edge, said piezoresistors of said third group being coupled to one another to form a third Wheatstone bridge; and
a fourth group of piezoresistors provided in said diaphragm proximate said fourth outer edge, said piezoresistors of said fourth group being coupled to one another to form a fourth Wheatstone bridge, and each of said first, second, third, and fourth Wheatstone bridges is configured to produce an output signal in response to movement of said diaphragm responsive to an external pressure.

17. The pressure sensor of claim 16 wherein:
said first Wheatstone bridge and said second Wheatstone bridge exhibit mirror symmetry relative to one another along a first line of symmetry; and
said third Wheatstone bridge and said fourth Wheatstone bridge exhibit mirror symmetry relative to one another along a second line of symmetry, said second line of symmetry being orthogonal to said first line of symmetry.

18. The pressure sensor of claim 16 wherein each of said first, second, third, and fourth Wheatstone bridges has a positive output node and a negative output node, and said pressure sensor further comprises:
a first differential amplifier having a first positive terminal, a first negative terminal, and a first output terminal, said first positive terminal being coupled to said positive output node of said first Wheatstone bridge, said first negative terminal being coupled to said negative output node of said first Wheatstone bridge, said first output terminal providing a first signal responsive to an external pressure detected by said first Wheatstone bridge; and
a second differential amplifier having a second positive terminal, a second negative terminal, and a second output terminal, said second positive terminal being coupled to said negative output node of said second Wheatstone bridge, said second negative terminal being coupled to said positive output node of said second Wheatstone bridge, and said second output terminal providing a second signal responsive to said external pressure detected by said second Wheatstone bridge;
a third differential amplifier having a third positive terminal, a third negative terminal, and a third output terminal, said third positive terminal being coupled to said positive output node of said third Wheatstone bridge, said third negative terminal being coupled to said negative output node of said third Wheatstone bridge, said third output terminal providing a third signal responsive to said external pressure detected by said third Wheatstone bridge; and
a fourth differential amplifier having a fourth positive terminal, a fourth negative terminal, and a fourth output terminal, said fourth positive terminal being coupled to said negative output node of said fourth Wheatstone bridge, said second negative terminal being coupled to said positive output node of said fourth Wheatstone bridge, and said fourth output terminal providing a fourth signal responsive to said external pressure detected by said fourth Wheatstone bridge.

19. The pressure sensor of claim 18 further comprising:
a fifth differential amplifier having a fifth positive terminal, a fifth negative terminal, and a fifth output terminal, said fifth positive terminal being coupled to said first output terminal of said first differential amplifier, said fifth negative terminal being coupled to said second output terminal of said second differential amplifier, and said fifth output terminal providing a fifth signal as an amplified difference between said first and second signals; and
a sixth differential amplifier having a sixth positive terminal, a sixth negative terminal, and a sixth output terminal, said sixth positive terminal being coupled to said third output terminal of said third differential amplifier, said sixth negative terminal being coupled to said fourth output terminal of said fourth differential amplifier, and said sixth output terminal providing a sixth signal as an amplified difference between said third and fourth signals, wherein said sixth signal is opposite in polarity from said fifth signal, and a signal output from said pressure sensor is an amplified difference between said fifth and sixth signals.

* * * * *